July 23, 1957   W. M. DUNCAN   2,800,319
APPARATUS FOR HEAT TREATING ORE
Filed Oct. 8, 1954   2 Sheets-Sheet 2
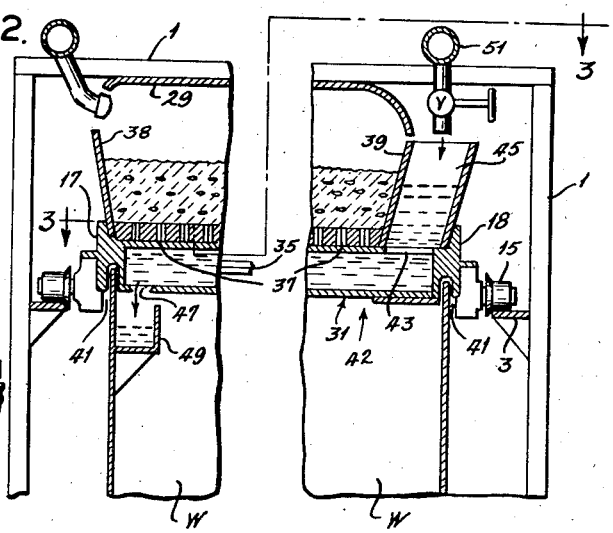
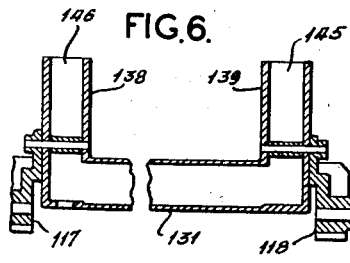
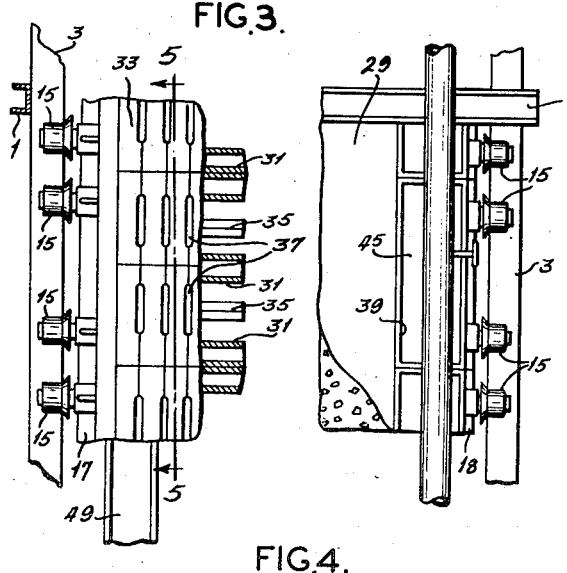
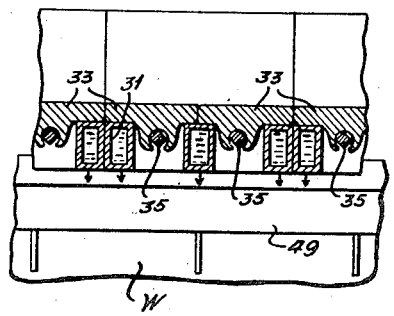
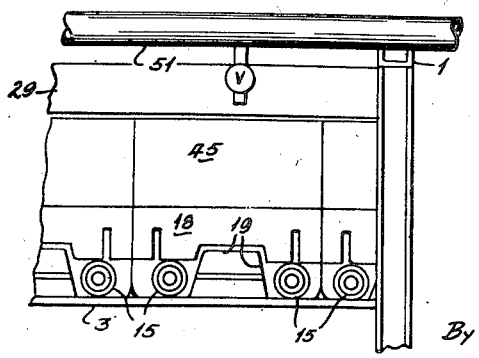
INVENTOR.
WILLIAM M DUNCAN
By Bruninga and Sutherland,
ATTORNEYS.

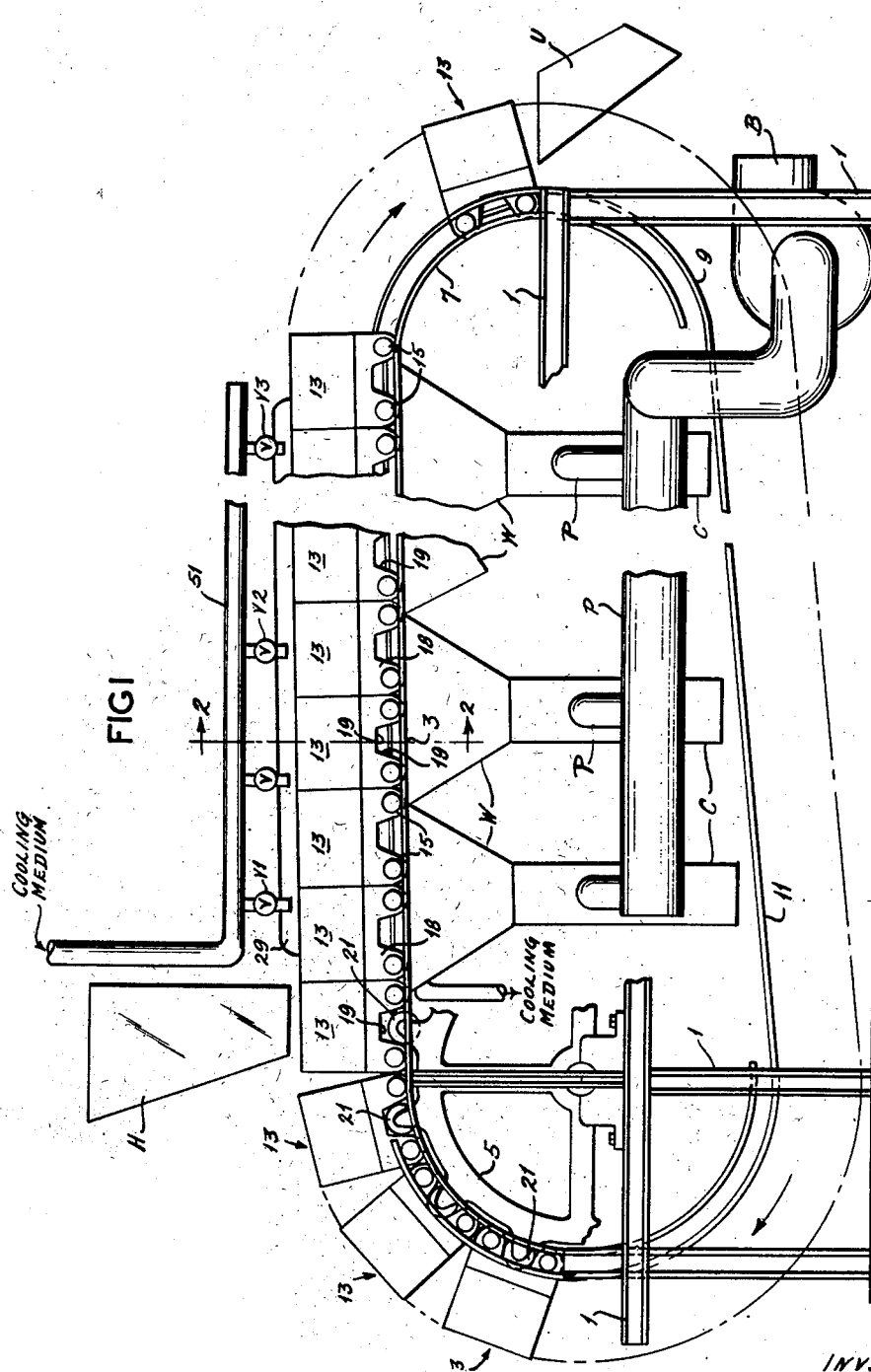

2,800,319
APPARATUS FOR HEAT TREATING ORE

William M. Duncan, Alton, Ill.

Application October 8, 1954, Serial No. 461,078

6 Claims. (Cl. 266—21)

This invention relates to pallet-type machines for sintering or otherwise heat-treating ore and the like, and more particularly to a machine for use in high-temperature applications.

It will be understood that a sintering machine comprises a series of wheeled grate-forming pallets, which ride upon rails extending along the sides of the machine. A sprocket at the forward end of the machine lifts the pallets to an upper reach of track where they are loaded, the pallets then moving along the upper reach as a continuous grate. At the rear end of the machine, the pallets are successively inverted to dump their contents, as they pass around a reverse bend, and thence move to the lifting sprocket along a lower reach of track.

In use, ore dust or other material to be heated admixed with fuel, such as coke, is dumped from a hopper onto the pallets, and as the pallets move rearwardly along the upper track, they pass over a series of wind boxes which induce a draft downwardly through the pallet grates, the fuel being consumed and the ore sintered into larger useable aggregates. A typical machine may be from six to twelve feet in width, the pallets extending across the machine and being aproximately two feet in width, that is to say the dimension of the pallets in the direction longitudinally of the machine is two feet.

Such machines are utilized in sintering a wide variety of materials, and one application of such a machine involves the heating of taconite iron ore pellets using auxiliary heating, as by burners mounted over the grates, but the temperatures required for this operation are very high. Indeed, the temperatures approach 2400° F. in some spots, and a serious problem is encountered in preventing the pallets from sagging, which is especially likely to occur in those frame members of the pallet that bridge the space across the track. It has been proposed that these members be made of larger cross sections, but this is not a satisfactory solution to the problem. After a period of time, the pallets will reach a predetermined operating temperature regardless of their size, and in heating taconite ore, this operating temperature is near the softening point of steel. Accordingly, it is an object of this invention to provide means for cooling the pallets as they travel about the machine, and in particular to maintain the track-bridging frame members of the pallets at a relatively low operating temperature by forced circulation of a cooling medium therethrough.

Briefly, these frame members are of hollow cross sections and are open at their ends so as to receive a cooling medium. This medium may be water or any other suitable fluid. In a preferred embodiment, the hollow frame members communicate with open-top boxes formed at the sides of the pallets for cooperation with a relatively fixed manifold extending along one side of the machine. Where water is employed as the cooling medium, the fixed manifold would include the plurality of water outlets, each of which is preferably provided with a valve. As the pallets are moved onto the upper reach of track, the open-top boxes thereof pass beneath a first series of valves which provide for a relatively low flow of water through the rail-bridging frame members. Means is provided at the other side of the machine for carrying off the water issuing from these frame members. As the pallets move toward the rear end of the machine, their temperature tends to rise, but this is counteracted by increasing the feed from the water outlets in the fixed manifold, thereby providing for increased water flow through the pallets. The manifold outlets near the rear of the machine may be relatively constricted so that the water flow through the pallets is reduced as they approach the rear of the machine. Ideally, the condition should be one wherein the individual pallets are substantially free of water as they move about the reverse bend at the end of the machine and travel along the lower reach of track toward the lifting sprocket.

Other features of the invention will be in part apparent from and in part pointed out in the following detail description taken in connection with the accompanying drawings, in which:

Fig. 1 is a side elevation of a sintering machine embodying features of this invention;

Fig. 2 is an enlarged section taken on the line 2—2 of Fig. 1;

Fig. 3 is a section taken on the line 3—3 of Fig. 2;

Fig. 4 is a side elevation of Fig. 3;

Fig. 5 is a cross section taken on the line 5—5 of Fig. 3; and

Fig. 6 is a view similar to that of Fig. 2, but showing an alternative embodiment of the invention.

Referring to the drawings, there is shown a sintering machine comprising a fixed framework 1 supporting a pair of rails 3, which constitute an upper reach of track. Lifting sprockets 5 are journalled on opposite sides of the machine at the forward end thereof, and the upper track 3 extends from over the sprockets along a slight rise toward the rear of the machine, as defined by a bend 7 in the track. The bend 7 cooperates with a reverse curve 9, which leads to a lower reach 11 of track extending down a slope beneath the lifting sprockets 5. This trackway supports a series of pallets 13, which have wheels 15 journalled at their sides 17 and 18. The side members 17 and 18 are also formed with pockets 19 for cooperation with tooth-forming rollers 21 carried by the sprocket wheels 5. Otherwise, the pallets bridge the space between the rails and have upstanding side walls. It may be observed, however, that the invention is also applicable to machines wherein the track itself is formed by a series of rollers on which the pallets ride.

In operation, the pallets 13 are lifted from the lower reach 11 to the upper reach 3 of track by the lifting sprocket 5. As the pallets are moved along the upper reach of track, they abut with one another to form a continuous trough, the fines being fed thereon from a hopper H at the forward loading zone of the machine. Individual pallets drop from the upper track when they reach the bend 7 therein, thereby dumping their contents into an unloading hopper U, and thence roll about the track 9 to collect on the track 11 beneath sprockets 5.

Heat is achieved from fuel, such as coke, admixed with the ore; and in high temperature applications, an oil or gas furnace 29 may be constructed over the upper reach for additional heating. Wind boxes W are mounted below the upper track 3 for cooperation with the bottoms of the pallets where they extend between the rails. These wind boxes open at their top, and the bottoms of the pallets are formed as open grates, so that a draft may be established through the material carried by the pallets. An induced downward draft is employed in most sintering operations since the fines are thus compacted on the grate, and any dust leaking through the grate may be readily collected from dust-collecting bottom portions C of the wind boxes. Lateral duct P extends from each wind box at a point above the bottom thereof to a blower B.

Sintering machines, as described, are well-known in the art, but the pallets are usually steel castings, the frame members thereof being solid. Although such machines function satisfactorily in sintering a wide variety of materials, there are some applications that require temperatures approaching the softening point of steel. For example, in heating the pellets of low grade iron ore obtained from taconite, portions of a pallet may be heated to temperatures as high as 2400° F. Indeed, the taconite process results in the pallets being heated to the point where the rail-bridging portions thereof are seriously weakened and commence to sag.

Accordingly, the invention contemplates that portions of the pallet, particularly the rail-bridging sections, will be formed with passages for circulation of a cooling medium. Referring to Figs. 2–5, the side members 17 and 18 of the pallets are secured to opposite ends of transverse frame members 31, which bridge the space between the rails and support a plurality of grate bars 33. The grate bars 33 extend across the frame members 31 and are secured by rods 35, draft openings 37 being provided between the several grate bars. The material to be sintered rests upon the grate bars and is contained along one side of the machine by plates 38 affixed to the side frame members 17. Plates 39 are secured at the other side of the pallets inwardly from the opposite frame members 18 in sealing relationship with the several transverse frame members 31. The furnace 29 is then mounted over the trough defined between the side plates 38 and 39; and the wind boxes have a sealing cooperation at 41 with the side members 17 and 18 of the pallets.

The transverse frame members 31 are hollow, being constructed, for example, from channel sections which are closed at the top by plates welded thereto. An inlet opening 43 is then formed in each frame member 31 at one side 18 of the machine for cooperation with an open-top inlet box 45, and a discharge port 47 is formed in each frame member 31 at the other side 17 of the machine for cooperation with a carry-off trough 49. The trough 49 may extend through the several wind boxes in sealing relationship therewith; or if desired, the trough might be mounted outwardly of the wind boxes, outlet ports being provided through the side members 17 for discharge of water.

The cooling medium would normally be water, which is fed to the pallets at the other side 18 of the machine from a relatively fixed manifold 51. This manifold extends along the side of the machine over the several inlet boxes 45 and has a series of longitudinally-spaced outlet valves V, the water flowing from the valves V directly into the boxes 45. The arrangement provides for variable control over the flow of cooling liquid along the machine in accordance with the needs therefor. For example, the pallets may not be heated significantly at the loading end of the machine, but as they move rearwardly, their temperature tends to rise. Accordingly, a valve V1 at the forward end of the machine is adjusted to a relatively low-volume flow of water, whereas a valve V2 near the center of the machine would be adjusted for a larger flow of water. The flow of water will also depend upon the restrictions 47 at the outlet side of the pallets and upon the head of water within the inlet tanks 45. As the pallets approach the rear of the machine, the water flow from a valve V3 may be reduced. Indeed, the reduction might be such that the inlet boxes or tanks 45 and the frame members 31 are empty when the pallets reach the unloading end of the machine.

Referring now to Fig. 6, there is shown an alternative embodiment wherein the pallet has a reservoir 146 on the side 117 of the machine as well as an inlet reservoir 145. Such reservoirs serve to cool the sides 138—139 of the pallet and prevent overheating of the side frame members 117 and 118, while also cooling the transverse members 131.

From the foregoing description, it is apparent that those skilled in the art will understand the structure, function and mode of operation of the invention herein disclosed, and appreciate the advantages thereof. Although one embodiment has been disclosed in detail, it is to be understood that the invention is not limited thereto, but the drawings and description thereof are to be understood as being merely illustrative. For example, fluids other than water may be utilized as the cooling medium. Where air is so employed, the fixed water manifold 51 might be replaced with an air manifold having a close sliding fit with the open tops of the inlet boxes 45. If only a slight flow of air is necessary to achieve the necessary cooling action for the particular sintering operation involved, it may be feasible to rely upon the vacuum in the wind boxes for the forced circulation, the frame members 31 having openings intermediate their ends for communication with the wind boxes and cool air being drawn in from the sides of the machine through the ends of the rail-bridging frame members.

It is realized that many modifications and variations will present themselves to those skilled in the art without departing from the spirit of this invention or the scope thereof as set forth in the appended claims.

Having thus described the invention, what is claimed and desired to be secured by Letters Patent is:

1. A sintering machine comprising a track extending along the sides of the machine, a series of pallets entrained on said track, means for moving the pallets along said track, each pallet being formed with side frame members and a hollow transverse frame member extending between said side members, an open-top box formed at one side of the pallet, said hollow frame members opening into said box, and a relatively fixed manifold extending along one side of the machine over the open-top boxes of said pallets, said manifold having a series of outlets for discharging a cooling fluid into said boxes.

2. A sintering machine as set forth in claim 1 wherein said fixed manifold has a series of longitudinally-spaced outlet valves for varying the discharge of cooling fluid to the individual pallets as they are moved along said track.

3. A sintering machine as set forth in claim 2 wherein said fixed manifold at one side of a machine is connected to a water supply, the other sides of said pallets having water-discharge ports, and a water carry-off trough fixed to the machine beneath said discharge ports of the several pallets.

4. A pallet for a sintering machine comprising a pair of side-forming frame members, a plurality of elongated hollow frame members extending between and fixed to said side-forming frame members, and an open-top box formed at one side of the pallet into which said elongated hollow frame members open, said hollow frame members having discharge ports at the other side of the pallet.

5. In a sintering machine having a series of pallets mounted for movement along upper and lower reaches of track and wherein each pallet has side frame members and transverse frame members extending between and fixed to said side members; the improvement comprising said transverse members being formed with longitudinal cooling passages therein which passages have ports at opposite ends thereof for a forced cooling medium, and a coolant manifold fixed to extend along one side of the sintering machine at the upper reach of track, said manifold being cooperable with the ports at one end of each transverse frame member for maintaining a flow of coolant through the transverse frame members of the pallets.

6. A sintering machine as set forth in claim 5, wherein the cooling manifold has a plurality of adjustable valves spaced along its length for controlling the flow of the cooling medium at different points along the length of the sintering machine, thereby to vary the cooling effect at different points along the upper reach of track.

References Cited in the file of this patent

UNITED STATES PATENTS

| 1,304,393 | Sherry | May 20, 1919 |
| 2,254,323 | Shallock | Sept. 2, 1941 |